Dec. 3, 1968  R. W. PETERS  3,413,717
ELECTRIC MOTOR

Filed March 25, 1965  2 Sheets-Sheet 1

INVENTOR.
ROBERT W. PETERS
BY
Wheeler, Wheeler & Wheeler
ATTORNEYS

Dec. 3, 1968  R. W. PETERS  3,413,717
ELECTRIC MOTOR

Filed March 25, 1965  2 Sheets-Sheet 2

INVENTOR.
ROBERT W. PETERS
BY
Wheeler, Wheeler + Wheeler
ATTORNEYS

United States Patent Office 3,413,717
Patented Dec. 3, 1968

3,413,717
ELECTRIC MOTOR
Robert W. Peters, Menomonee Falls, Wis., assignor to
Henry J. Gorski, Milwaukee, Wis.
Filed Mar. 25, 1965, Ser. No. 442,686
5 Claims. (Cl. 29—605)

ABSTRACT OF THE DISCLOSURE

This invention relates to a method of winding a stator wherein a pyramidal lap wound stator is provided with three separate, substantially identical phase windings, each phase winding being lapped with respect to one of the other phase windings. Each phase winding is formed by lapping a plurality of coil groups, which groups have been formed by pyramidally winding a plurality of coils.

---

The invention relates to dynamoelectric machines and to stator windings for such machines. More particularly, the invention relates to pyramidal lap wound stators.

The invention provides a fully symmetrical, pyramidal, lap wound, polyphase winding arrangement. In accordance with the invention, three separate phase windings are provided, each of which phase windings is substantially identical and is lapped with respect to one of the other phase windings. Each phase winding comprises a plurality of lapped coil groups, each coil group including a plurality of pyramidal wound coils, and each coil including a plurality of turns, each turn having two sides which are located in respective, angularly spaced slots.

In accordance with the invention, the phase windings can be provided in more than one layer. However, the coil groups which are lapped with respect to one another are all located in the same layer.

The winding pattern or arrangement herein disclosed therefore avoids the previous practice wherein at least some coils were located partially in the radially outer part of one coil slot and partially in the radially inner part of another coil slot and facilitates automatic winding without having to temporarily retain a radially inner winding out of its associated slot until the associated radially outer winding was laid in the slot.

In one preferred form of the invention, the total number of turns in each slot is substantially identical, although the number of turns in each of the coils of the associated coil group is varied so as to avoid undesirable electrical harmonics. Specifically, the coils in each coil group are arranged so that the innermost of the pyramidal wound coils has a span of 40 degrees and the fewest number of turns. The next radially outwardly located coil has a span of 60 degrees and a greater number of turns. The next radially outwardly located coil has a span of 80 degrees and a still greater number of turns. As will be seen in more detail hereinafter, the winding arrangement is such that the coil groups in the radially outer portions of the stator slots are angularly displaced from the coil group in the radially inner portions of the coil slots so that the turns of the heaviest of the overlying outermost coils in the overlying coil groups are located in the slots which contain the least or innermost coils of the underlying coil groups in the radially outer portions of the coil slots. Similarly, the coils in the outer layer having an intermediate number of turns are located with their sides in the slots which contain the sides of the coils in the underlying coil groups having an intermediate number of turns. Finally, in the overlying coil groups, the radially innermost coils have the fewest number of turns are located in the slots containing the radially outermost of the heaviest coils in the underlying coil group of the outer layer. In the specifically disclosed construction, the coil group in the inner and outer layers are angularly offset by 60 degrees.

The symmetrical arrangement of the wire arrangement or pattern also facilitates simultaneous winding of two or more coil groups at one time depending upon the specific winding arrangement being employed. As a result of the disclosed winding arrangement, pyramidal lap wound stators can be machine wound far more effectively and quickly than in the past. In addition, a pyramidal lap wound winding having better electrical characteristics can be obtained. Still further, the disclosed winding arrangement permits the use of less copper in the winding than previously possible for a given power rating.

The invention also provides a method of winding a stator. Other objects and advantages of the invention will become known by reference to the following description and the accompanying drawings in which.

Figure 5:
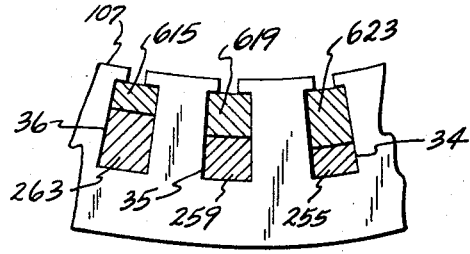

FIG. 5 is a circumferential sectional view along one face of the stator 101 with the winding through the slots 34, 35 and 36 being shown in section.

Figure 1:
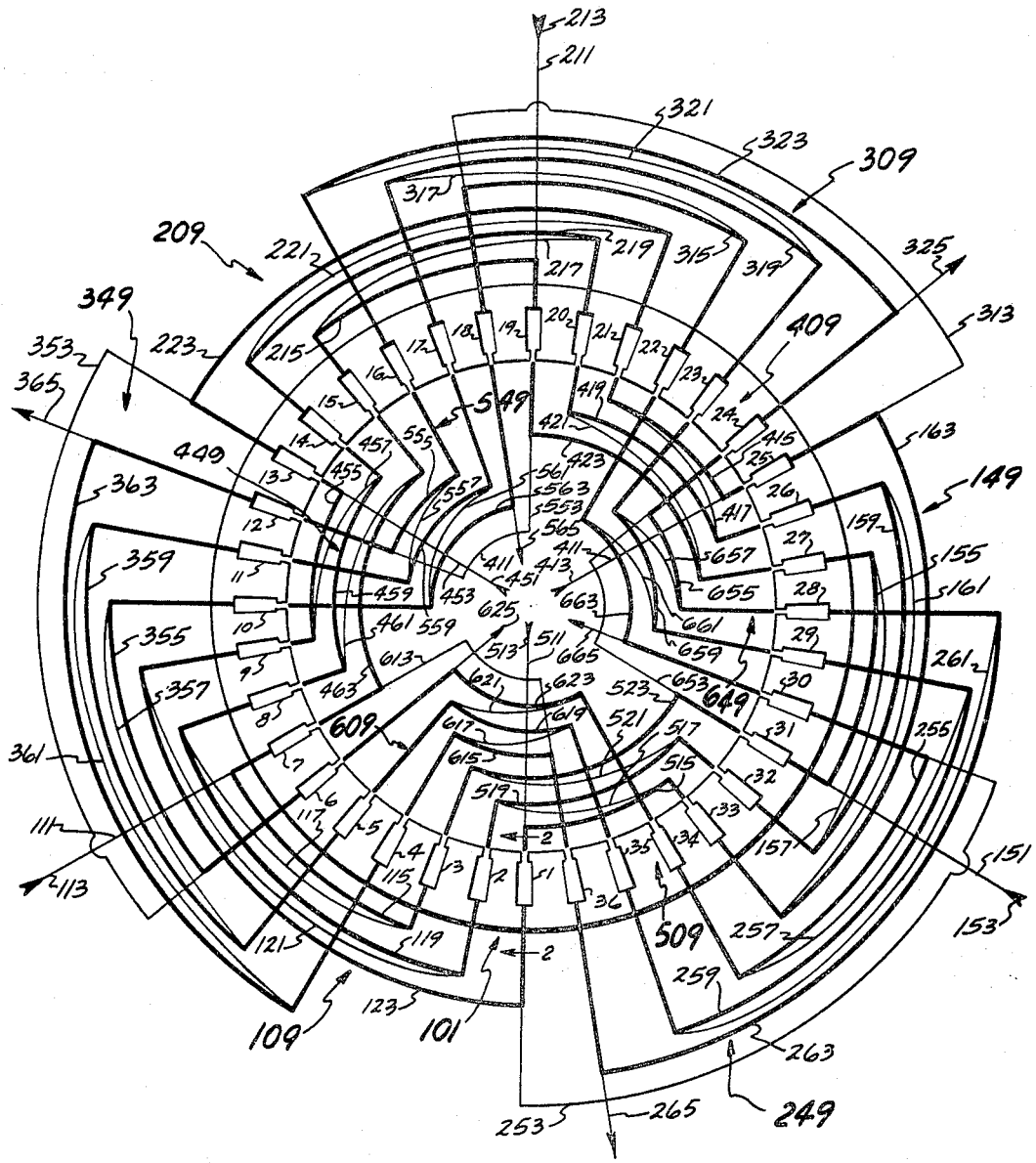
FIG. 1 is a wiring diagram of a stator winding embodying various features of the invention.
Figure 2:
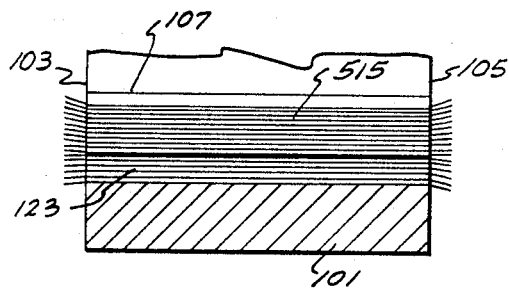
FIG. 2 is an enlarged sectional view taken along line 2—2 of FIG. 1.

Shown diagrammatically in FIGURE 1 of the drawings is the stator 101 of a three-phase electrical motor, which stator 101 includes a winding arrangement embodying various of the features of the invention and comprising three lapped phase windings. Each of the phase windings includes four coil groups and each coil group includes three coils. As will be seen in greater detail, the phases are lapped and the coils in each group are pyramidally wound. Each coil includes a plurality of turns and has two parallel sides which are located in angularly spaced slots.

More specifically, the stator 101 includes a pair of end faces 103 and 105, a central bore 107 extending between the end faces 103 and 105, and a series of slots which extend between the end faces 103 and 105 and radially outwardly from the bore 107. Each slot includes a radially outwardly located part or portion and a radially inwardly located part or portion. The invention can be employed with stators having various numbers of slots. In the specifically disclosed construction, thirty-six slots are employed, such slots being number 1–36. As is readily apparent, the angular span between each slot is 10 degrees.

A winding arrangement in accordance with the invention can comprise several coil layers, each coil layer wholly incorporating all of the coils in several coil groups. In the specifically disclosed construction, two coil layers are employed, each coil layer comprising six coil groups, three of the six coil groups being lapped coil groups, and the other three coil groups being lapping coil groups. Also in accordance with the invention, the lapped coil groups are placed in the slots prior to the lapping coil groups, thereby permitting direct placement of the lapping coils into the slots at the time of coil winding. While the lapped coils can be successively laid, in accordance with the preferred practice, the three lapped coil groups in the first or radially outer layer are simultaneously wound by a multiple-needle winding head. Each lapped coil group in the first or radial outer coil laper is therefore substantially identical to one another.

In order therefore to provide a first coil group 109, a wire 111 having an end comprising a tap 113, is laid in one direction through the slot 7, i.e., from the face 103 to the face 105, then arcuately with a portion which is not shown in FIGURE 1 and which, if shown, would extend counterclockwise as seen in FIGURE 1 across the stator face 105 radially outwardly of the bore 107, then in the other direction through the slot 3, and then arcuately clockwise as seen in FIGURE 1 along the other stator face 103 radially outwardly of the bore 107 and back to the slot 7 to form a first coil 115, having a span of 40 degrees. This process is repeated until the desired number of turns is included in the first coil 115.

When the desired number of turns has been laid in the coil 115, the wire 111 extending from the slot 3 is laid with a portion 117 extending along the stator face 103 to the slot 8. The wire 111 is then laid through the slot 8, arcuately across the stator face 105 radially outwardly of the corresponding part of the coil 115, through the slot 2 in the other direction, and across the stator face 103 radially outwardly of the corresponding part of the coil 115 back to the slot 8 to form a second coil 119 having a span of 60 degrees.

After the desired number of coils has been included in the coil 119, the wire 111 extending from the slot 2 is located with a portion 121 extending along the stator face 103 to the slot 9. The wire 111 is then laid through the slot 9, arcuately across the stator face 105 radially outwardly of the corresponding part of the coil 119, through the slot 1, and across the stator face 103 radially outwardly of the corresponding part of the coil 119 and back to the slot 9 to form a third coil 123 having a span of 80 degrees. This operation is continued until the desired number of turns is included in the coil 123. The coils 115, 119, and 123 constitute the first coil group 109 which will be subsequently lapped.

In the preferred practice of the invention, the second and third coil groups are wound simultaneously with the first coil group 109. Thus, in order to provide the second coil group 149, a wire 151 having an end comprising a tap 153 is laid in one direction, i.e., from the face 103 to the face 105, through the slot 31, then arcuately in the counterclockwise direction as seen in FIGURE 1 across the stator face 105 radially outwardly of the bore 107, in the other direction through the slot 27, and then arcuately in the clockwise direction as seen in FIGURE 1 along the other stator face 103 radially outwardly of the bore 107 and back to the slot 31 to form a coil 155 having a span of 40 degrees.

After the desired number of turns is included in the coil 155, the wire 151 extending from the slot 27 is laid with a portion 157 extending along the stator face 103 to the slot 32. The wire 151 is then laid through the slot 32, arcuately across the stator face 105 radially outwardly of the corresponding part of the coil 159, through the slot 25, and across the stator face 103 radially outwardly of the corresponding part of the coil 159 and back to the slot 33 to form still another coil 163 having a span of 80 degrees. This operation is continued until the desired number of turns is included in the coil 165. The coils 155, 159, and 163 comprise the second coil group 149 which is subsequently lapped.

In the preferred practice, a third coil group 209 is formed by laying a wire 211 having an end comprising a tap 213, in one direction through the slot 19, i.e., from the face 103 to the face 105, then arcuately in the counterclockwise direction as seen in FIGURE 1, across the stator face 105 radially outwardly of the bore 107, then in the other direction through the slot 15, and then arcuately in the clockwise direction as seen in FIGURE 1, along the other stator face 103 radially outwardly of the bore 107 and back to the slot 19 to form a coil 215 having a span of 40 degrees.

After the desired number of turns is included in the coil 215, the wire 211 extending from the slot 15 is laid with a portion 217 extending along the stator face 103 to the slot 20. The wire 211 is then laid through the slot 20, arcuately across the stator face 105 radially outwardly of the corresponding part of the coil 215, through the slot 14, and across the stator face 103 radially outwardly of the corresponding part of the coil 215 and back to the slot 20 to form another coil 219 having a span of 60 degrees.

After the desired number of turns has been included in the coil 219, the wire 211 extending from the slot 14 is laid with a portion 221 extending along the stator face 103 to the slot 21. The wire 211 is then laid through the slot 21, arcuately across the stator face 105 radially outwardly of the corresponding part of the coil 219, through the slot 13, and across the stator face 103 radially outwardly of the corresponding part of the coil 219 back to the slot 21 to form still another coil 223 having a span of 80 degrees. This operation is continued until the desired number of turns is included in the coil 223. The coil 215, 219, and 223 comprise the third coil group 209 which is subsequently lapped.

After the desired number of turns has been laid in the coils 123, 163, and 223, the wires 111, 151, and 201 could be severed, and additional wires employed for the winding of the next coil groups. However, in order to afford continuous and simultaneous winding and to avoid later connection of the taps, in the preferred practice, the fourth, fifth, and sixth coil groups are now wound without severing the wires 111, 151, and 211.

Specifically, in order to form a fourth coil group 249, the wire 111 which extends from the slot 1 after completion of the first coil group 109 is laid with a portion 253 extending arcuately across the stator face 103 through an arc of 70 degrees and radially outwardly of the bore 107 to the slot 30. The fourth coil group 249 is then reversely wound with respect to the direction of winding of the first coil group 109 and in lapping relation to the second coil group 149. Specifically, the wire 111 is laid in the one direction through the slot 30, i.e., from the face 103 to the face 105, then arcuately in the clockwise direction as seen in FIGURE 1 across the stator face 105 radially outwardly of the bore, then in the other direction through the slot 34, and then arcuately in the counterclockwise direction as seen in FIGURE 1, along the other stator face 103 radially outwardly of the bore 107 and back to the slot 30 to form a coil 255 having a span of 40 degrees.

After the desired number of turns is included in the coil 255, the wire 111 extending from the slot 34 is laid with a portion 257 extending along the stator face 103 to the slot 29. The wire is then laid through the slot 29, arcuately across the stator face 105 radially outwardly of the corresponding part of the coil 255, through the slot 35, and arcuately across the stator face 103 radially outwardly of the corresponding part of the coil 255 and back to the slot 29 to form another coil 259 having a span of 60 degrees.

After the desired number of turns has been included in the coil 259, the wire 111 extending from the slot 35 is laid with a portion 261 extending along the stator face 103 to the slot 28. The wire 111 is then laid through the slot 28, arcuately across the stator face 105 radially outwardly of the corresponding part of the coil 259, through the slot 36, and arcuately across the stator face 103 radially outwardly of the corresponding part of the coil 259 and back to the slot 28 to form still another coil 263 having a span of 80 degrees. This operation is repeated until the desired number of turns is included in the coil 263. The coils 255, 259, and 263 constitute the fourth coil group 249. After the desired number of turns has been laid in the coil 263, in the preferred practice of the invention, the wire 111 extending from the slot 36 is cut to provide a tap 265.

In order to afford wiring of a fifth coil group 309, the wire 151 which extends from the slot 25 after completing the second coil group 149, is laid with a portion 313 extending arcuately across the stator face 103 through an arc of 70 degrees and radially outwardly of the bore 107 to the slot 18. The fifth coil group 309 is then reversely wound with respect to the direction of winding of the second coil group 149 and in lapping relation to the third coil group 209.

Specifically, the wire 151 is laid in one direction through the slot 18, i.e., from the face 103 to the face 105, then arcuately in the clockwise direction as seen in FIGURE 1 across the stator face 105 radially outwardly of the bore 107, then in the other direction through the slot 22, and then arcuately in the counterclockwise direction as seen in FIGURE 1, along the other stator face radially outwardly of the bore 107 and back to the slot 18 to form a coil 315 having a span of 40 degrees.

After the desired number of turns is included in the coil 315, the wire 151 extending from the slot 22 is laid with a portion 317 extending along the stator face 103 to the slot 17. The wire 151 is then laid through the slot 17, arcuately across the stator face 105 radially outwardly of the corresponding part of the coil 315, through the slot 23, and across the stator face 103 radially outwardly of the corresponding part of the coil 315 and back to the slot 17 to form another coil 319 having a span of 60 degrees.

After the desired number of turns has been included in the coil 319, the wire 151 leading from the slot 23 is laid with a portion 321 extending arcuately along the stator face 103 to the slot 16. The wire 151 is then laid through the slot 16, arcuately across the stator face 105 radially outwardly of the corresponding part of the coil 319, through the slot 24, and across the stator face 103 radially outwardly of the corresponding part of the coil 177 and back to the slot 16 to form still another coil 323 having a span of 80 degrees. This operation is repeated until the desired number of turns is included in the coil 323. The coils 315, 319, and 323 comprise the fifth coil group 309. After the desired number of turns has been laid in the coil 323, in the preferred practice of the invention, the wire 151 extending from the slot 24 is cut to provide a tap 325.

In order to form the sixth coil group 349, the wire 211 which extends from the slot 13 after completion of the third coil group 209 is laid with a portion 353 extending arcuately across the stator face 103 through an arc of 70 degrees and radially outwardly of the bore 107 to the slot 6. The coil group 349 is then reversely wound with respect to the direction of winding of the third coil group 209 and in lapping relation to the first coil group 109.

Specifically, the wire 211 is laid through the slot 6 in one direction, i.e., from the face 103 to the face 105, then arcuately in the clockwise direction as seen in FIGURE 1, across the stator face 105 radially outwardly of the bore 107 in the other direction through the slot 10, and then arcuately in the counterclockwise direction as seen in FIGURE 1, along the stator face 103 radially outwardly of the bore 107 and back to the slot 6 to form a coil 355 having a span of 40 degrees.

After the desired number of turns is included in the coil 355, the wire 211 extending from the slot 10 is laid with a portion 357 extending along the stator face 103 to the slot 5. The wire is then laid through the slot 5, arcuately across the stator face 105 radially outwardly of the corresponding part of the coil 355, through the slot 11, and across the stator face 103 radially outwardly of the corresponding part of the coil 355 and back to the slot 5 to form another coil 359 having a span of 60 degrees.

After the desired number of coils has been included in the coil 359, the wire 211 leading from the slot 11 is laid with a portion 361 extending along the face 103 to the slot 4. The wire is then laid through the slot 4, arcuately across the stator face 105 radially outwardly of the corresponding part of the coil 359, through the slot 12, and across the stator face 103 radially outwardly of the corresponding part of the coil 359, and back to the slot 4 to form still another coil 363 having a span of 80 degrees. After the desired number of turns has been laid in the coil 363, the wire 211 extending from the slot 12 is cut to provide a tap 365. The coils 355, 359, and 363 comprise the sixth coil group 349.

When the wires are being simultaneously laid in the slots to form the fourth, fifth, and sixth coil groups 249, 309, and 349, respectively, the first, second, and third coil groups 109, 149, and 209, respectively, have already been laid in their respective slots and there is no difficulty in lapping of the first, second, and third coil groups by the sixth, fourth, and fifth coil groups, respectively. After completion of the first six coil groups, the first coil layer is provided. In the first coil layer, the radially outermost portion of each of the thirty-six slots is occupied by a separate one of the thirty-six coil sides comprising the first coil layer. The first and fourth, the second and fifth, and the third and sixth coil groups are all symmetrical to each other and are located 120 degrees apart. In addition, the first and sixth coil groups 109 and 349 are lapped through an angular span of 50 degrees, as are the second and fourth coil groups 149 and 249, and the third and fifth coil groups 209 and 309. Still further, the direction of winding of the first, second, and third coil groups 109, 149, and 209 is reversed with respect to the direction of winding of the fourth, fifth, and sixth coil groups 249, 309, and 349.

A second or inner layer of coil groups which are located in the radially inner parts of the slots and which are substantially identical to the coil groups 109, 149, 209, 249, 309, and 349 of the first layer, but which are angularly offset by 60 degrees from the coil groups in the first layer, are also provided.

In order to obtain the first coil group in the second layer, i.e., the seventh coil group 409, a wire 411 having an end comprising a tap 413 is laid through the slot 25 in one direction, i.e., from the face 103 to the face 105, then arcuately with a portion which is not shown in FIGURE 1, and which if shown, would extend in the counterclockwise direction as seen in FIGURE 1 across the stator face 105 radially outwardly of the bore 107, then through the slot 21 in the other direction, and arcuately in the clockwise direction, as seen in FIGURE 1, and along the other stator face 103 radially outwardly of the bore 107 and back to the slot 25 to form a first coil 415 having a span of 40 degrees.

After the desired number of turns is included in the coil 415, the wire 411 extending from the slot 21 is laid with a portion 417 extending along the stator face 103 to the slot 26. The wire 411 is then laid through the slot 26, arcuately across the stator face 105 radially outwardly of the corresponding part of the coil 415, through the slot 20 and across the stator face 103 radially outwardly of the corresponding part of the coil 415 and back to the slot 26 to form another coil 419 having a span of 60 degrees.

After the desired number of coils has been included in the coil 419, the wire 411 extending from the slot 20 is laid with a portion 421 extending along the stator face 103 to the slot 27. The wire 411 is then laid through the slot 27, arcuately across the stator face 105 radially outwardly of the corresponding part of the coil 419, through the slot 19, and across the stator face 103 radially outwardly of the corresponding part of the coil 419 and back to the slot 27 to form still another coil 423 having a span of 80 degrees. This operation is continued until the desired number of turns is included in the coil 423. The coils 415, 419, and 423 constitute the seventh coil group 409.

In like manner to the formation of the coil groups in the first or outer coil layer, the eighth and ninth coil groups are preferably wound simultaneously with the seventh coil group 409. Thus, in order to provide an eighth coil group 449, a wire 451 having an end comprising a tap 453 is laid through the slot 13 in one direction, i.e., from the face 103 to face 105, then arcuately in the counterclockwise direction as seen in FIGURE 1 across the stator face 105 radially outwardly of the bore 107, then through the slot 9 in the other direction, and then arcuately in the clockwise direction as seen in FIGURE 1, along the other stator face 103 radially outwardly of the bore 107 and back to the slot 13 to form a coil 455 having a span of 40 degrees.

After the desired number of turns is included in the coil 455, the wire 451 extending from the slot 9 is laid with a portion 457 extending along the stator face 103 to the slot 14. The wire 451 is then laid through the slot 14, arcuately across the stator face 105 radially outwardly of the corresponding part of the coil 451, through the slot 8, and across the stator face 103 radially outwardly of the corresponding part of the coil 451 and back to the slot 14 to form another coil 459 having a span of 60 degrees.

After the desired number of turns has been included in the coil 459, the wire 451 extending from the slot 8 is laid with a portion 461 extending arcuately across face 103 to slot 15. The wire 451 is then laid through the slot 15, arcuately across the stator face 105 radially outwardly of the corresponding part of the coil 459, through the slot 7, and across the stator face 103 radially outwardly of the corresponding part of the coil 459 and back to the slot 15 to form still another coil 463 having a span of 80 degrees. This operation is continued until the desired number of turns is included in the coil 463. The coils 455, 459, and 463 comprise the eighth coil group 449.

In order to provide a ninth coil group 509, a wire 511 having an end comprising a tap 513 is laid through the slot 1 in one direction, i.e., from the face 103 to the face 105, then arcuately in the counterclockwise direction as seen in FIGURE 1 across the stator face 105 radially outwardly of the bore 107, then through the slot 33 in the other direction, and then arcuately in the clockwise direction as seen in FIGURE 1 along the stator face 103 radially outwardly of the bore 107 and back to the slot 1 to form a coil 515 having a span of 40 degrees.

After the desired number of turns is included in the coil 515, the wire 511 extending from the slot 33 is laid with a portion 517 extending along the stator face 103 to the slot 2. The wire 511 is then laid through the slot 2, arcuately across the stator face 105 radially outwardly of the corresponding part of the coil 515, through the slot 32, and across the stator face 103 radially outwardly of the corresponding part of the coil 515 and back to the slot 2 to form another coil 519 having a span of 60 degrees.

After the desired number of turns has been included in the coil 519, the wire extending from the slot 31 is laid with a portion 521 extending along the face 103 to the slot 3. The wire 511 is then laid through the slot 3, arcuately across the stator face 105 radially outwardly of the corresponding part of the coil 519, through the slot 30, and across the stator face 103 radially outwardly of the corresponding part of the coil 519 and back to the slot 3 to form still another coil 523 having a span of 80 degrees. This operation is continued until the desired number of turns is included in the coil 523. The coils 515, 519, and 523 comprise the ninth coil group 509.

After the desired number of turns has been laid in the coils 423, 463, and 523, the wires 411, 451, and 511 could be severed, and additional wires employed for the winding of the next coil groups. However, in order to afford continuous and simultaneous winding and to avoid later connection of taps, in the preferred practice, the tenth, eleventh, and twelfth coil groups are wound without severing the wires 411, 451, and 511.

Specifically, in order to form a tenth coil group 549, the wire 411 which extends from the slot 19 after completion of the seventh coil group 409 is laid with a portion 553 extending arcuately across the stator face 103 through an arc of 70 degrees and radially outwardly of the bore 107 to the slot 12. The tenth coil group 549 is then reversely wound with respect to the direction of winding of the seventh coil group 409 and in lapping relation to the eighth coil group 449. Specifically, the wire 411 is laid through the slot 12 in one direction, i.e., from the face 103 to the face 105, then arcuately in the clockwise direction as seen in FIGURE 1, across the stator face 105 radially outwardly of the bore 107, then in the other direction through the slot 16, and then arcuately in the counterclockwise direction as seen in FIGURE 1 along the other stator face 103 radially outwardly of the bore 107 and back to the slot 12 to form a coil 555 having a span of 40 degrees.

After the desired number of turns is included in the coil 555, the wire 411 extending from the slot 16 is laid with a portion 557 extending along the stator face 103 to the slot 11. The wire 411 is then laid through the slot 11, arcuately across the stator face 105 radially outwardly of the corresponding part of the coil 555, through the slot 17, and across the stator face 103 radially outwardly of the corresponding part of the coil 555 and back to the slot 11 to form another coil 559 having a span of 60 degrees.

After the desired number of turns has been included in the coil 559, the wire 411 extending from the slot 17 is laid with a portion 561 extending along stator face 103 to slot 10. The wire 411 is then laid through the slot 10, arcuately across the stator face 105 radially outwardly of the corresponding part of the coil 559 and back to the slot 10 to form still another coil 563 having a span of 80 degrees. This operation is repeated until the desired number of turns is included in the coil 563. The coils 555, 559, 563 constitute the tenth coil group 549. After the desired number of turns has been laid in the coil 563, in the preferred practice of the invention, the wire 411 extending from the slot 18 is cut to provide a tap 565.

In order to afford wiring of an eleventh coil group 609, the wire 451 which extends from the slot 7 after completion of the coil group 449, is laid with a portion 613 extending arcuately across the stator face 103 through an arc of 70 degrees and radially outwardly of the bore 107 to the slot 36. The eleventh coil group 609 is then reversely wound with respect to the direction of winding of the eighth coil group 449 and in lapping relation to the ninth coil group 509.

Specifically, the wire 451 is laid through the slot 36 in one direction, i.e., from the face 103 to the face 105, then arcuately in the clockwise direction as seen in FIGURE 1 across the stator face 105 radially outwardly of the bore 107, then in the other direction through the slot 4, and then arcuately in the counterclockwise direction as seen in FIGURE 1 along the other stator face 103 radially outwardly of the bore 107 and back to the slot 36 to form a soil 615 having a span of 40 degrees.

After the desired number of turns is included in the coil 615, the wire 451 extending from the slot 4 is laid with a portion 617 extending arcuately across face 103 to slot 35. The wire 451 is then laid through the slot 35, arcuately across the stator face 105 radially outwardly of the corresponding part of the co il 615 and back to the slot 35 to form another coil 619 having a span of 60 degrees.

After the desired number of turns has been included in the coil 619, the wire 451 leading from the slot 5 is laid with a portion 621 extending arcuately along the face 103 to the slot 34. The wire 451 is then laid through the slot, arcuately across the stator face 105 radially outwardly of the corresponding part of the coil 619, through the slot 6, and across the stator face 103 radially outwardly of the corresponding part of the coil 619 and back to the slot 34 to form still another coil 623 having a span of 80 degrees. This operation is repeated until the desired number of turns is included in the coil 623. The coils 615, 619, and 623 comprise the eleventh coil group 609. After the desired number of turns has been laid in the coil 623, in the preferred practice of the invention, the wire 451 extending from the slot 6 is cut to provide a tap 625.

In order to form the last or twelfth coil group 649, the wire 511 which extends from the slot 31 after completion of the ninth coil group 509 is laid with a portion 653 extending arcuately across the stator face 103 through an arc of 70 degrees and radially outwardly of the bore 107 to the slot 24. The twelfth coil group 649 is then reversely wound with respect to the direction of winding of the ninth coil group 509 and in lapping relation to the seventh coil group 409.

Specifically, the wire 511 is laid through the slot 24 in one direction, i.e., from the face 103 to the face 105, then arcuately in the clockwise direction as seen in FIGURE 1, across the stator face 105 radially outwardly of the bore 107, then in the other direction through the slot 28, and then arcuately in the counterclockwise direction as seen in FIGURE 1 along the other stator face 103 radially outwardly of the bore and back to the slot 24 to form a coil 655 having a span of 40 degrees.

After the desired number of turns is included in the coil 655, the wire 511 extending from the slot 28 is laid with a portion 657 extending along the stator face 103 to the slot 23. The wire 511 is then laid through the slot 23, arcuately across the stator face 105 radially outwardly of the corresponding part of the coil 655, through the slot 29, and across the stator face 103 radially outwardly of the corresponding part of the coil 655 and back to the slot 23 to form another coil 659 having a span of 60 degrees.

After the desired number of coils has been included in the coil 659, the wire 511 leading from the slot 29 is laid with a portion 661 extending along the stator face 103 to the slot 22. The wire 511 is then laid through the slot 22, arcuately across the stator face 105 radially outwardly of the corresponding part of the coil 659, through the slot 30 and across the stator face 103 radially outwardly of the corresponding part of the coil 659 and back to the slot 22 to form still another coil 663 having a span of 80 degrees. This operation is repeated until the desired number of turns is included in the coil 663. After the desired number of turns has been laid in the coil 663, the wire 511 extending from the slot 30 is cut to provide a tap 665. The coils 655, 659, and 663 comprise the twelfth coil group 649.

When the wires are being symmetrically laid in the slots to form the tenth, eleventh, and twelfth coil groups 549, 609, and 649, respectively, the seventh, eighth, and ninth coil groups 409, 459, and 509 respectively, have already been located in their associated slots and there is accordingly no problem in lapping the seventh, eighth, and ninth coil groups by the tenth, eleventh, and twelfth coil groups.

In the second or radially inner coil layer, the innermost portion of each of the thirty-six slots is occupied by a separate one of the thirty-six coil sides comprising the second coil layer. The seventh and tenth, the eighth and eleventh, and the ninth and twelfth coil groups are all symmetrical to one another and are located 120 degrees apart. In addition, the seventh and twelfth, the eighth and tenth, and the ninth and eleventh coil groups are lapped through an angular span of 50 degrees.

Completion of the twelfth coil group 649 completes the winding of the disclosed stator. However, if desired, a third or more layers of coil groups could be provided.

As already noted, it is desirable that the winding arrangement be symmetrical. In addition to the symmetrical features which have already been discussed, it is desirable, from the standpoint of symmetry, that each slot includes approximately the same number of coil sides or wires. Various arrangements can be employed. For instance, each coil slot could have an equal number of coil windings from each of the inner coil layer and the outer coil layer. In another possible arrangement, 30 percent of the coil windings in each slot could be from one of the inner and outer coil layers and the other 70 percent could be from other of the inner and outer coil layers.

In order to obtain the best results, it is preferred to wind each pyramidal coil group so that the innermost coil, for instance, as seen in FIGURE 5, the coil 255 in the coil group 249, has less turns than the other two coils 259 and 263. It is also preferred to wind the radially outermost coil in each coil group, for instance, the coil 623 in the coil group 609, with more turns than the inner two coils 615 and 619. Thus, in the coil groups 249 and 609 shown in FIGURE 5, intermediate coils 259 and 619 are illustrated as including less turns than the respectively radially outer coils 263 and 623 in the coil groups 249 and 609, and more turns than the respectively radially inner coils 255 and 615 in the coil groups 249 and 609.

Although it is preferred to have substantially the same number of wires in each slot, the number of wires in each slot can be varied and still obtain various of the features of the invention.

Because of the angular offset between the inner and outer coil layers, the radially outermost coils in the outer layer are overlaid on the radially innermost coils of the inner layer, the intermediate coils in the outer and inner coil groups are laid in the same slots, and the radially innermost coils in the outer layer are overlaid on the radially outermost coils of the inner layer. However, the total number of coil sides in each slot is substantially identical notwithstanding variation in each coil group, thereby preserving overall symmetry.

Figure 3:
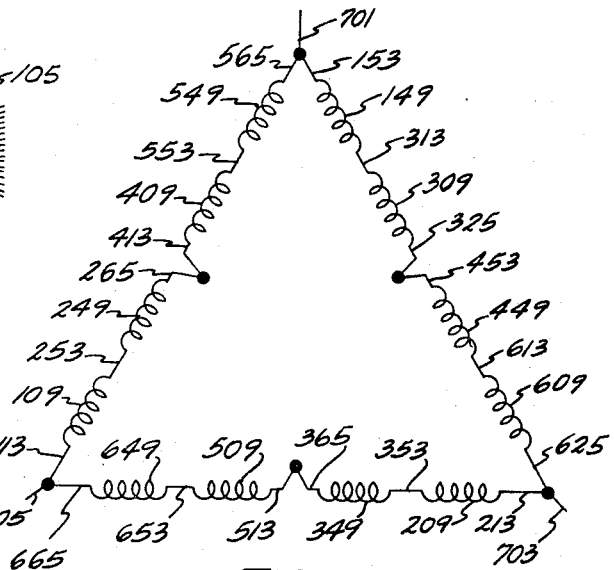
FIG. 3 is a diagram showing a delta connection of the winding shown in FIG. 1.

Depending upon the usage to which the wound stator is intended, the several coil groups can be connected in various ways. In FIGURE 3, the coil groups are shown connected in a conventional delta arrangement. Specifically, the coil groups are shown schematically and are indicated by their respective reference numerals. In addition, the taps extending from the coil groups are identified by their respective reference numerals. Except for noting that the taps are connected as shown and that the connected taps 153 and 163 form a first lead 701, that the connected taps 213 and 625 form a second lead 703, and that the connected taps 113 and 665 form a third lead 705, it is believed that it is unnecessary to further describe in detail the connection of the taps as the delta arrangement is believed to be well known.

Figure 4:
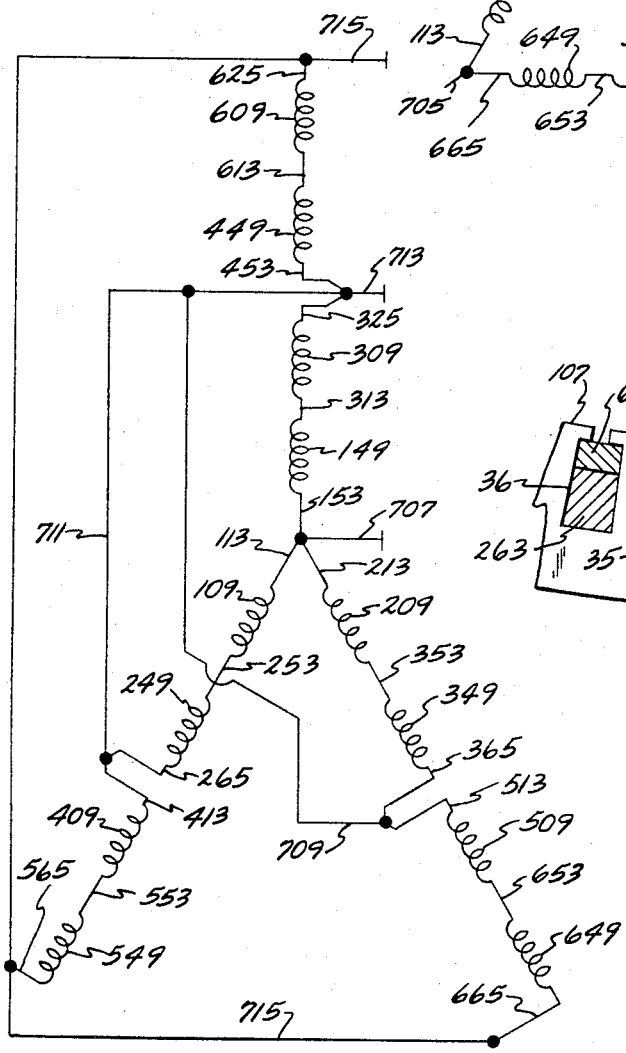
FIG. 4 is a diagram showing a Y connection of the winding shown in FIG. 1.

In FIGURE 4, the coil groups are shown connected in a Y arrangement. Again, the coil groups are shown schematically and identified by their respective reference numerals. In addition, the leads of the coil groups are also identified by their respective reference numerals. Except to note that the taps 113, 153, and 213 are connected together at the center to form lead 707, taps 365 and 513 are connected together to form lead 709, that the taps 265 and 413 are connected together to form lead 711, that the taps 325 and 453 are connected together and joined to leads 709 and 711 to form lead 713, and that tap 665 is connected by lead 715 to tap 565 and to tap 625, it is believed that it is unnecessary to further describe in detail the connection of the taps as Y arrangements are believed to well known.

In addition to the winding arrangements described above with respect to a thirty-six slot stator, the invention is also applicable to stators having other slot arrangements. For instance, the invention can be used with a forty-eight slot stator. Under such circumstances, each coil group could comprise four coils and the span of said coils would be respectively about 37½ degrees, 52½ degrees, 67½ degrees, and 82½ degrees. The invention could also be used with a twenty-four slot stator. In such case, each coil group would include two coils having respective spans of 45 degrees and 75 degrees.

As already noted, the invention is also applicable to winding arrangements having more than two coil layers. Some of the advantages of the invention can also be obtained in coil winding arrangements which are not lapped.

Various of the features of the invention are set forth in the following claims.

What is claimed is:

1. A method of winding a stator having a central bore in a plurality of radially outwardly extending slots, said method comprising the steps of winding a first plurality of pyramidally wound coil groups in the radially outermost portions of some of the stator slots, subsequently winding a second plurality of pyramidally wound coil groups in the radially outermost portions of the other of the stator slots in lapping relation to the first plurality of coil groups and in reverse direction to the direction of winding of the first plurality of coil groups to complete a first coil layer comprising the first and second plurality of coil groups and occupying the radially outermost portions of all of the stator slots, subsequently winding a third plurality of pyramidally wound coil groups in the radially innermost portions of some of the stator slots, and subsequently winding a fourth plurality of pyramidally wound coil groups in the radially innermost portions of the other of the stator slots in lapping relation to the third plurality of coil groups and in the reverse direction to the direction of winding of the third plurality of coil groups to complete a second coil layer comprising the third and fourth plurality of coil groups and occupying the radially outermost portions of all of the stator slots.

2. A method of winding a stator having a central bore and a plurality of slots extending radially outwardly from said bore, said method comprising the steps of simultaneously winding a first plurality of wires to form a first plurality of pyramidally wound coil groups in the radially outermost portions of some of the stator slots, subsequently simultaneously winding the first plurality of wires to form a second plurality of pyramidally wound coil groups in the radially outermost portions of the other of the stator slots in lapping relation to the first plurality of coil groups, in integrally wound relation to the first plurality of coil groups, and in reverse direction to the direction of winding of the first plurality of coil groups to complete a first coil layer comprising the first and second plurality of coil groups and occupying the radially outermost portions of all of the stator slots, subsequently simultaneously winding a second plurality of wires to form a third plurality of pyramidally wound coil groups in the radially innermost portions of some of the stator slots, and subsequently simultaneously winding the second plurality of wires to form a fourth plurality of pyramidally wound coil groups in the radially innermost portions of the other of the stator slots in lapping relation to the third plurality of coil groups, in integrally wound relation to the third plurality of coil groups, and in the reverse direction to the direction of winding of the third plurality of coil groups to complete a second coil layer comprising the third and fourth plurality of coil groups and occupying the radially outermost portions of all of the stator slots.

3. A method of winding a stator having a central bore and a plurality of slots extending radially outwardly from said bore, said method comprising the steps of simultaneously winding a first plurality of a predetermined number of pyramidally wound coil groups in the radially outermost portions of some of the stator slots, subsequently simultaneously winding a second plurality of a like predetermined number of pyramidally wound coil groups in the radially outermost portions of the other of the stator slots in lapping relation to the first plurality of coil groups and in reverse direction to the direction of winding of the first plurality of coil groups to complete a first coil layer comprising the first and second plurality of coil groups and occupying the radially outermost portions of all of the stator slots, subsequently simultaneously winding a third plurality of a like predetermined number of pyramidally wound coil groups in the radially innermost portions of some of the stator slots and in angularly offset relation to the coil groups in the first coil layer, and subsequently simultaneously winding a fourth plurality of a like predetermined number of pyramidally wound coil groups in the radially innermost portions of the other of the stator slots in lapping relation to the third plurality of coil groups, in the reverse direction to the direction of winding of the third plurality of coil groups, and in like angular offset relation to the coil groups in the first coil layer to complete a second coil layer comprising the third and fourth plurality of coil groups and occupying the radially outermost portions of all of the stator slots.

4. A method of winding a stator having a central bore and a plurality of slots extending radially outwardly from said bore, said method comprising the steps of simultaneously winding a first three wires to form a first group of three pyramidally wound coil groups in the radially outermost portions of one-half of the stator slots, subsequently simultaneously winding the first three wires to form a second group of three pyramidally wound coil groups in the radially outermost portions of the other half of the stator slots in lapping relation to the first group of coil groups, in integrally wound relation to the first group of coil groups, and in reverse direction to the direction of winding of the first group of coil groups to complete a first coil layer occupying the radially outermost portions of all of the stator slots, and comprising the first and second groups of coil groups, subsequently simultaneously winding a second three wires to form a third group of pyramidally wound coil groups in the radially innermost portions of one-half of the stator slots and in angularly offset relation to the first group of coil groups, and subsequently simultaneously winding the second three wires to form a fourth group of pyramidally wound coil groups in the radially innermost portions of the other half of the stator slots in lapping relation to the third group of coil groups, in integrally wound relation to the third group of coil groups, in the reverse direction to the direction of winding of the third group of coil groups and in angularly offset relation to the second group of coil groups to complete a second coil layer occupying the radially outermost portions of all of the stator slots, and comprising the third and fourth groups of coil groups.

5. A method of winding a stator having a central bore and a plurality of radially outwardly extending slots, said method comprising the steps of winding a first plurality of pyramidally wound coil groups in the radially outermost portions of some of the stator slots, subsequently winding a second plurality of pyramidally wound coil groups in the radially outermost portions of the other of the stator slots in lapping relation to the first plurality of coil groups to complete a first coil layer comprising the first and second plurality of coil groups and occupying the radially outermost portions of all of the stator slots, subsequently winding a third plurality of pyramidally wound coil groups in the radially innermost portions of some of the stator slots, and subsequently winding a fourth plurality of pyramidally wound coil groups in the radially innermost portions of the other of the stator slots in lapping relation to the third plurality of coil groups to complete a second coil layer comprising the third and fourth plurality of coil groups and occupying the radially outermost portions of all of the stator slots.

References Cited

UNITED STATES PATENTS

| 2,647,696 | 8/1953 | Brunand | 242—1.1 |
| 2,905,840 | 9/1959 | Dunn | 310—202 |
| 3,290,759 | 12/1966 | Cory | 29—605 X |
| 3,321,653 | 5/1967 | Sonoyama | 310—180 |

JOHN F. CAMPBELL, Primary Examiner.

C. E. HALL, Assistant Examiner.